Oct. 27, 1953      E. WILDHABER      2,656,731
INTERMITTENT MECHANICAL MOTION
Filed March 28, 1951      3 Sheets-Sheet 1

ANGULAR POSITION OF DRIVING MEMBER

INVENTOR.
ERNEST WILDHABER
BY
Richard W. Treverton
ATTORNEY

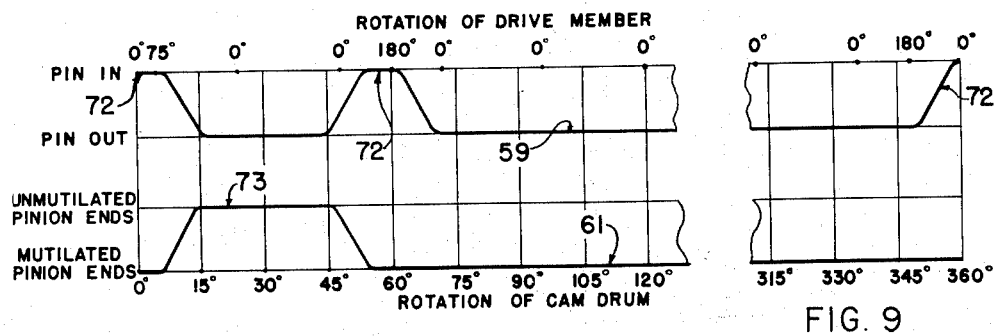
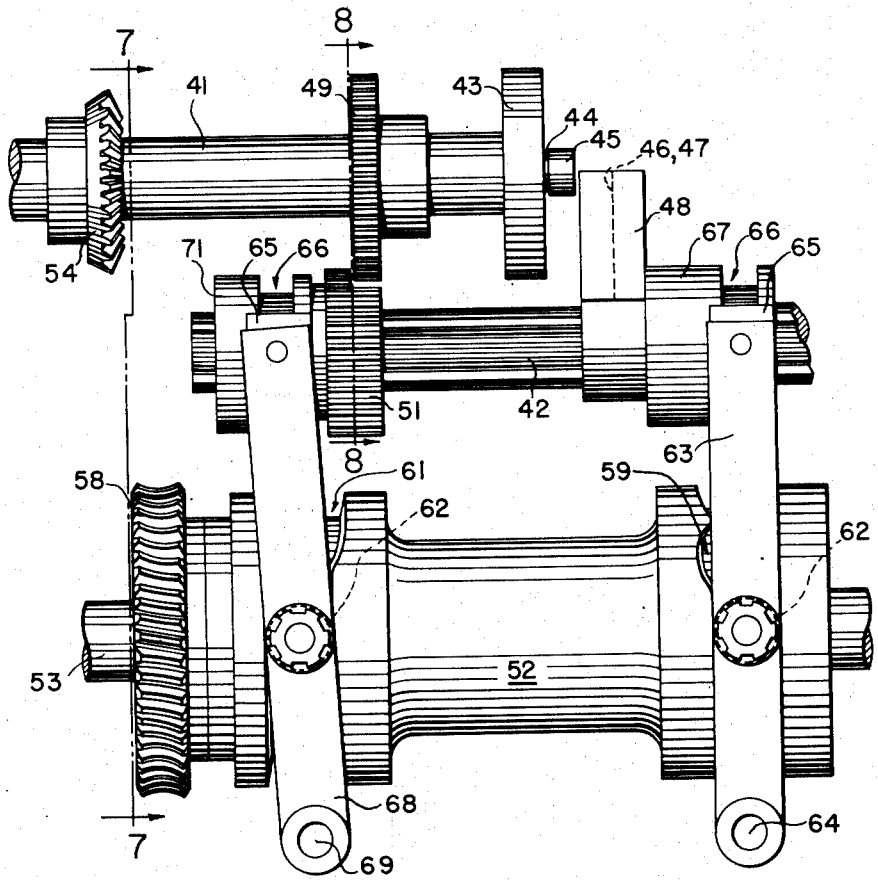
FIG. 6
FIG. 9
INVENTOR.
ERNEST WILDHABER

Oct. 27, 1953     E. WILDHABER     2,656,731
INTERMITTENT MECHANICAL MOTION
Filed March 28, 1951     3 Sheets-Sheet 3
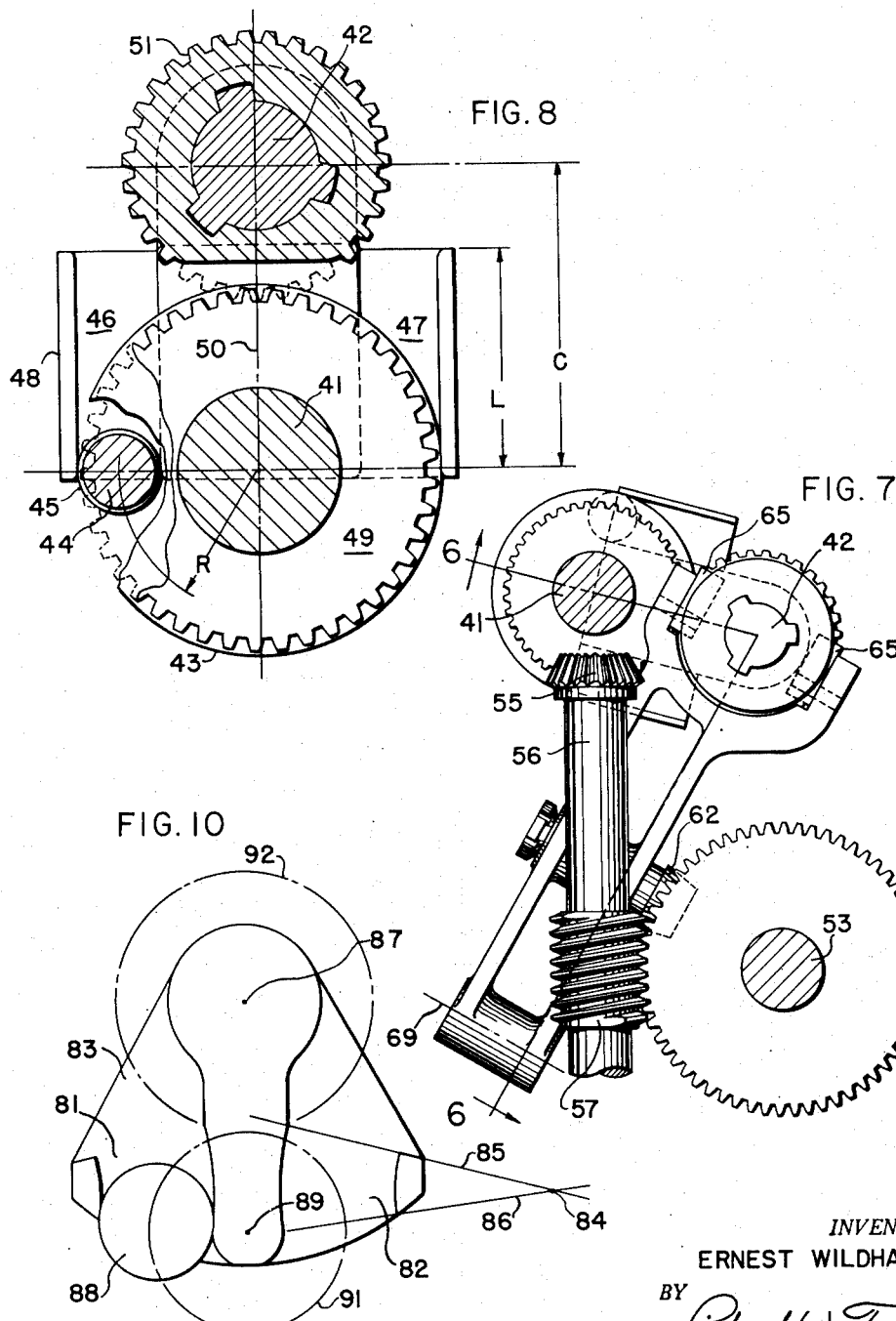
INVENTOR.
ERNEST WILDHABER
BY
Richard W. Treverton
ATTORNEY Patented Oct. 27, 1953

2,656,731

UNITED STATES PATENT OFFICE 2,656,731

INTERMITTENT MECHANICAL MOTION

Ernest Wildhaber, Brighton, N. Y., assignor to The Gleason Works, Rochester, N. Y., a corporation of New York Application March 28, 1951, Serial No. 217,993

18 Claims. (Cl. 74—393)

The present invention relates to a mechanical motion for converting constant rotation into intermittent rotation.

The invention relates particularly to motions of the type in which a rotatable driven member is accelerated gradually from a dwell to its maximum velocity ratio with respect to a rotatable drive member, is rotated at this velocity ratio through a predetermined angle, and is then decelerated gradually to a dwell in which it remains while the drive member rotates through a predetermined angle. An object of the invention is a motion of this character in which each operating cycle will extend over one or more complete revolutions of both members, although the members do not necessarily both make the same number of revolutions during the cycle.

A further objective is a motion of the character described which utilizes for the varying velocity ratio parts of the cycle a pin-and-slot drive means in which the slots are of constant curvature, i. e. are either straight or of circular arc form, and therefore are simple and inexpensive to make. A still further objective is a motion of the character described in which toothed gear elements provide the drive during the constant velocity ratio part of the cycle. This, of course, makes desirable an arrangement of the pin-and-slot drive means that will provide a velocity ratio equal to that of the gear elements at the moments of transition to and from the gear drive, and that will provide a zero acceleration of the driven member at such moments.

To meet these objectives the invention provides a driven member having a pair of non-radial slots open at both ends, each slot having its two ends at different radial distances from the axis of rotation of the member. The drive member has pin means arranged to pass alternately through the two slots as it rotates, entering each slot at one end and leaving from the opposite end. The slots are so disposed that their outer ends both lie in the circular path of the pin means when the driven member is stationary. The arrangement is such that as the drive member rotates to carry the pin means through one slot, from the outer end to the inner end, the driven member is accelerated; and that as the pin means passes through the other slot, from the inner end to the outer end, the driven member is decelerated.

In order to enable the driven member to make more than one revolution during the constant velocity part of each cycle, and to enable the driven member to remain stationary during more than one-half turn of the drive member, the invention provides means to effect a relative axial displacement of the drive and driven members sufficient to separate the paths of the pin means and the slots. Such axial displacement is effected, in timed relationship with the rotation of the drive member, while the drive is through the gears and also while the driven member is stationary.

Of the pair of gears which rotate with the drive and driven members at least one is mutilated in order to provide a hiatus in the gear drive during the periods of deceleration, dwell and acceleration of the driven member. However in a case where the gear drive is to operate through more than one turn of the driven member during each cycle, it it necessary to eliminate this hiatus during part of the cycle. To this end only one end of one gear is mutilated and means are provided to effect a relative axial displacement of the gears in time with rotation of the drive member, so that the mutilated end is operative during the part of the cycle when the pin-and-slot means are driving, and the unmutilated end during the constant velocity ratio part of the cycle.

The foregoing and other objects and advantages will appear from the following detailed description of three different embodiments of the invention that are shown in the drawings, wherein:

Fig. 6 is a view showing in elevation certain component parts of another embodiment of the invention, the parts being viewed in the directions indicated in Fig. 7 by angularly related lines 6—6;

Fig. 7 is a sectional view taken at right angles to Fig. 6, and as indicated by line 7—7 of Fig. 6;

Fig. 8 is a view taken in a plane parallel to Fig. 7, as indicated by line 8—8 on Fig. 6, the view however being rotated to a position corresponding to Figs. 2 to 4, inclusive, wherein the driven member is disposed above the drive member;

Fig. 9 is a diagram showing the tracks of the two cams shown in Fig. 6, and,

Fig. 10 is a diagrammatic view, similar to Fig. 2, but depicting an embodiment of the invention wherein the slots are of circular arc form.

Figure 1:
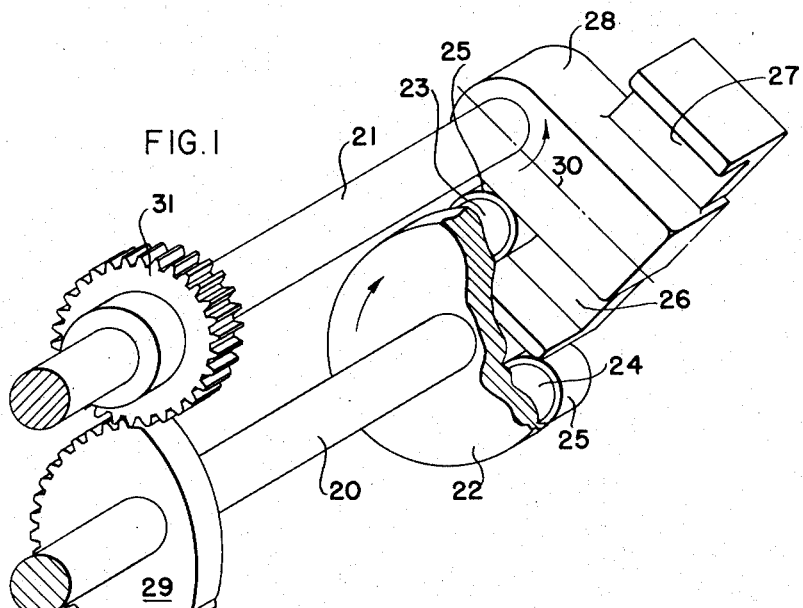
Fig. 1 is an oblique projection of one embodiment.

In the device shown in Figs. 1 through 4, the numeral 20 designates a drive shaft and 21 a driven shaft. On shaft 20 is a drive member comprising a disc 22 carrying a pair of crank pins 23 and 24 which have anti-friction rollers 25 at their outer ends. The two pins are disposed on a common diameter of the disc and at equal radial distances from the axis of shaft 20, so that both of them follow the same circular path as the shaft rotates. The pins, or, more exactly, the rollers which comprise the ends of the pins, are engageable in slots 26 and 27, of a driven member 28 affixed to shaft 21, as the shafts rotate. Secured to shaft 20 is a mutilated drive gear 29, and secured to shaft 21 is a mating driven pinion 31. In Fig. 1 the gears, the drive member 22 and the driven member have been spaced far apart along the shafts 20 and 21 so that they may be seen more clearly; in practice they may be arranged much more compactly.

The slots 26 and 27 are parallel and non-radial, and are symmetrical with respect to a radius 30 from the axis of shaft 21. Each slot is open at both ends and has one end, hereinafter termed its inner end, at a smaller radial distance from the axis of shaft 21 than its opposite, or outer, end. The slots are so disposed that the outer ends of both of them lie in the path of the pin means 23, 24 in one position of the drive member, this being the position shown in Fig. 2.

Figure 2:
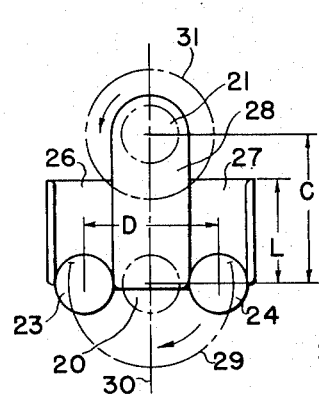
Figs. 2, 3 and 4 are diagrammatic end views showing three successive positions which the drive and driven members of Fig. 1 assume during their operating cycle.
Figure 3:
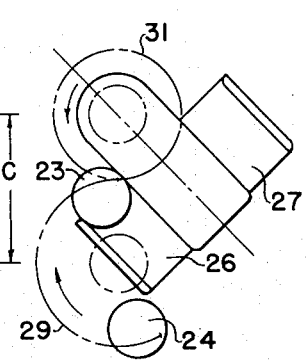
Figure 4:
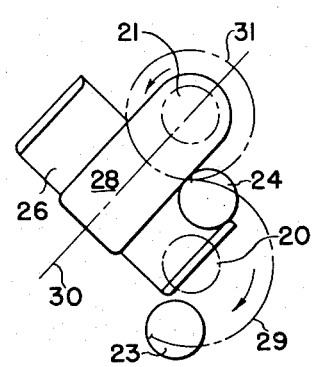

In operation of the device shown in Figs. 1 through 4, it is assumed first that the drive member 22 is rotating in the direction of the arrow shown on it, that the pin 23 is just entering the outer end of slot 26 and the pin 24 just leaving the outer end of slot 27. The driven member 28 is momentarily stationary since the slots are now tangential to the direction of motion of the pins. As pin 23 now passes through the slot 26, the driven member is accelerated; and, at the moment it leaves the inner end of slot 26 (the position shown in Figs. 1 and 3), the velocity ratio of the driven member to the drive member is maximum. At this moment the first tooth of the mutilated gear 29 comes into driving engagement with the pinion 31. The drive continues through the gears, both pins being clear of the slots, until the position shown in Fig. 4 is reached. At this moment the last tooth of the mutilated gear 29 is just passing from driving engagement with the pinion 31, and the pin 24 is entering the inner end of slot 27. As pin 24 now passes through the slot 27, the driven member is decelerated to a stop in the position shown in Fig. 2, and there has been completed one cycle of operation embracing one complete revolution of both the drive and driven members.

In this particular embdiment of the invention the ratio of the pitch diameters of gear 29 to pinion 31 is 13/10. The pinion has 30 teeth and the gear 22, although if unmutilated it would have 39 teeth. The arrangement is such that in moving from the position shown in Fig. 3 to that of Fig. 4 the drive member turns through an angle of 210 degrees while the driven member turns through an angle of 273 degrees. The diameter D of the circular path of the centers of the pins is 0.932 C and the length L of the slots is 0.684 C, where C is the center distance between shafts 20 and 21.

Figure 5:
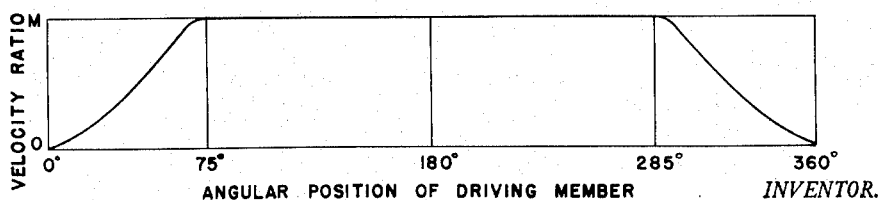
Fig. 5 is a velocity diagram showing the variation in velocity ratio of the drive and driven members depicted in Figs. 1 to 4, inclusive, throughout their operating cycle.

With this proportioning of the parts, which may be determined either graphically or by calculation, the velocity of the driven member throughout the operating cycle is as shown in the velocity diagram, Fig. 5: During the first 75 degrees of rotation of the driving member (from the position of Fig. 2), the driven member gradually accelerates from a dwell to its maximum velocity, indicated by M. As the 75 degree position is approached the acceleration decreases to zero, so that the velocity of the driven member is constant at the moment the gear drive takes over from the pin-and-slot drive. During the next 210 degrees of rotation of the driving member the velocity of the driven member remains constant at its maximum. During the final 75 degrees of rotation of the driving member, the driven member decelerates to a stop, the pattern of the deceleration being an exact reversal of the aforementioned acceleration.

The zero acceleration of the driven member, at the moments of transition between the gear drive and the pin-and-slot drive, is obtained by proper location of the inner ends of the slots, and is indicated on Fig. 5 of the drawings by the tangential entry of the velocity curve into the maximum velocity line M. It enables smooth entry and departure of the first and last teeth of the mutilated drive gear into and from engagement with the driven pinion.

The device illustrated in Figs. 6, 7 and 8 is an embodiment of the invention provided for use in the indexing mechanism of a machine tool. The arrangement is such that a complete cycle of operation extends over fifteen revolutions of the drive shaft 41, of which two and one-half turns are devoted to turning the driven shaft through three turns. During the remaining twelve and one-half turns of the drive shaft the driven shaft remains stationary.

Mounted on the drive shaft 41 is a drive disc 43 carrying a single pin 44 which has a roller portion 45 for driving engagement in slots 46 and 47 of a driven member 48 that is splined to the driven shaft 42 for axial movement therealong. In the position of the member 48 shown in Fig. 6 the pin and the slots are axially displaced and hence cannot now engage as the drive member rotates. Like slots 26 and 27, the slots 46 and 47 are straight, parallel and symmetrically disposed relative to a radius 50 from the axis of driven shaft 42.

Also affixed to the drive shaft is a drive gear 49 adapted to run in mesh with a driven pinion 51 that is splined to the driven shaft for movement axially therealong. One end only of the pinion is mutilated: when the pinion rotates while in the position shown in Fig. 6 its mutilated end runs with gear 49; when shifted to the right the unmutilated end of the pinion runs with the gear.

To effect shifting of the driven member 48 and the pinion 51 on the driven shaft 42, there is a cam drum 52 mounted on a shaft 53 that is driven from shaft 41 via a bevel gear 54 on shaft 41, a bevel pinion 55 on a shaft 56, a worm 57 on the shaft 56, and a wormwheel 58 on the cam shaft 53. The drum 52 has one cam track, 59, for shifting the driven member 48, and another cam track, 61, for shifting the mutilated pinion 51. Engaged in track 59 is cam follower 62 of a shifter lever 63 which is pivoted at one end on a fixed axis 64 and at its opposite end carries pivoted bearing blocks 65 that are engaged in an annular groove 66 of a collar 67 which is a part of the driven member 48. A similar shifter lever 68 pivoted at one end on a fixed axis 69 also has at its opposite end pivoted bearing blocks 65 engaged in an annular groove 66 of a collar 71 of the mutilated pinion 51. Lever 68 also has a cam follower 62, and this follower engages cam track 61.

In this particular embodiment, the ratio of gearing 54, 55, 57, 58 is such that the drive shaft 41 makes fifteen turns for each turn of the cam drive 52 (one complete operating cycle): the cam turns 24 degrees for each complete turn of the drive shaft 41. A development of the cam tracks 59 and 61 is shown in Fig. 9, from which it will be seen that the track 59 has two rises 72 for shifting the slotted driven member 48. When the cam follower 62 is at the top of either rise, denoted in Fig. 9 as "Pin In," the pin and slot 44, 46, 47 are engageable; and when at the bottom of either rise, designated "Pin Out" they are unengageable. The track 61 has but one rise 73 for shifting the pinion 51 to and from the position wherein its unmutilated end runs with gear 49.

The operation of the device will now be described in connection with Figs. 8 and 9. In the position shown in Fig. 8, wherein the pin is just entering slot 46, the driven shaft is completing its dwell, and the cam followers 62 (Fig. 6) of the shifter levers are engaging the respective cam tracks at the 0° position. As this is at the top of a rise 72 of track 59 and at a dwell portion of track 61, the slotted driven member 48 is shifted to the left of the position thereof shown in Fig. 6 and the pin 44 is therefore engageable in the slot 46; and the pinion 51 is in the position shown, with its mutilated end running with the gear 49. As the shaft 41 rotates the pin 44 moves through the slot 46, accelerating the driven member 48 and shaft 42. At the moment when the pin leaves slot 46 (which in this embodiment is when the driving member has turned 75 degrees) the acceleration of member 48 and shaft 42 is zero, and at this time the gear 49 comes into driving engagement with the first tooth of the mutilated end of piston 51. After the drive through gears 49 and 51 has started, the cam track 61 begins to shift the pinion 51 to bring its unmutilated end into mesh with gear 49, so that the gears run in mesh through slightly more than two complete turns (750 degrees) of the drive shaft. The cam rise 73 receeds toward the end of this period so that before the end of it the mutilated end of the pinion again runs with the gear, to thereby enable the pin-and-slot drive to take over at this point.

Concomitantly with the relative axial shifting of the gear drive elements to cause the unmutilated end of the pinion to drive, the cam track 59 effects shifting of member 48 to thereby cause relative axial displacement of the pin and slot drive means. As a result the pin and slot drive means does not interfere with the aforementioned gear drive through 750 degrees of rotation of the drive shaft. Toward the end of this period of gear drive, the member 48 is returned in the position thereof wherein the pin 44 is engageable in the slots; and, when the gear drive ends, the pin enters and passes through slot 47, thereby decelerating the driven member to a stop at the end of two and one-half turns of the driver from the starting position. At this time the cam drum has turned through 60 degrees, and there is no drive through the gears 49, 51 because the mutilated portion of pinion 51 is abreast of the gear 49.

During the next one-half turn of the driving member, the cam track 59 again shifts the driven member 48 to render the pin and slots unengageable; and maintains this condition during the following eleven and one-half turns of the driving member. At the end of this period, when the cam drum has turned through 348 degrees and the driver is 180 degrees short of completion of its fifteenth turn, the pin 44 is again abreast of the outer end of slot 47. During the final one-half turn of the driving member the cam track 59 effects movement of member 48 to again render the pin engageable in the slots; and the operating cycle is now completed.

In this particular embodiment of the invention the radius R of the circular path of the center of pin 44 is 0.468 C and the length L of the slots is 0.690 C, where C is the center distance between shafts 41 and 42. These are the dimensional relationships which will provide for a constant velocity ratio of the driven member by the pin-and-slot means equal to the velocity ratio of the drive gear, which is 41/31. There are forty-one teeth on the drive gear 49 and thirty-one on the driven pinion. Of the latter seven teeth are omitted at the mutilated end.

In Fig. 10 is shown an embodiment of the invention in which symmetrically disposed slots 81 and 82 of a driven member 83 are of circular arc form, the center of the arc of slot 82 being designated 84. The inner and outer ends of the slot lie along radial lines 85 and 86 from the center 84. The driven member is rotatable about axis 87 and the drive member, which comprises a pin 88, is rotatable about axis 89. Rotatable with the drive member is a drive pinion whose pitch circle is shown at 91. A mutilated driven gear, whose pitch circle is designated 92, is affixed to the driven member. As in the embodiments described hereinbefore, the outer ends of the slots 81 and 82 both lie in, and are tangential to, the path of pin 88 when the pin is leaving slot 82 or entering slot 81. The length of the slots (or the angle between radii 85, 86) and the positions of their centers of curvature are so chosen, in relation to the center distances between axes 89 and 92 and to the radial distance of the center of the pin from axis 89, that when the pin is at the inner ends of the slots the velocity ratio of pin-and-slot drive means is momentarily constant and equal to the velocity ratio of the gears 91, 92.

The foregoing disclosure of several different embodiments is made by way of example to illustrate and explain the inventive principles involved, and not by way of limitation, there being no intention to limit the scope of the invention except as may be required by the appended claims.

I claim:

1. An intermittent mechanical motion comprising a rotatable driven member having a pair of non-radial slots open at both ends and a rotatable drive member having pin means arranged to pass through the slots by entering at one end and leaving from the opposite end, each slot having its opposite ends at different radial distances from the axis of the driven member, and the slots being so disposed that their outer ends both lie in the path of the pin means in one position of the driven member.

2. An intermittent mechanical motion as characterized by claim 1 in which the slots are so disposed that the pin means imparts zero velocity to the driven member when at the outer ends of the slots and zero acceleration when at the inner ends of the slots.

3. An intermittent mechanical motion as characterized by claim 1 in which the pin means comprises a pair of pins that are diametrically opposed with respect to the axis of the drive member, each of the pins being adapted to pass through both of the slots.

4. An intermittent mechanical motion as characterized by claim 1 in which the path for the pin means through each slot is of constant curvature.

5. An intermittent mechanical motion as characterized by claim 1 in which there is a pair of gears rotatable with said members for effecting a constant velocity ratio drive between them, beginning when the pin means leaves the inner end of one slot and ending when the pin means next enters the inner end of the other slot.

6. An intermittent mechanical motion as characterized by claim 1 in which the pin means comprises a single pin adapted to pass alternately through the two slots.

7. An intermittent mechanical motion as characterized by claim 4 in which the path for the pin means through each slot is a circular arc, and in which the slots are symmetrically disposed with respect to a radius from the axis of the driven member.

8. An intermittent mechanical motion as characterized by claim 4 in which the slots are straight.

9. An intermittent mechanical motion as characterized by claim 8 in which the slots are parallel.

10. An intermittent mechanical motion as characterized by claim 5 in which certain teeth of said gears are mutilated to provide a hiatus in said constant velocity ratio drive during at least that part of the cycle of operation in which the pin means is passing through the slots.

11. An intermittent mechanical motion as characterized by claim 10 in which the pin means comprises a pair of pins that are diametrically opposed with respect to the axis of the drive member, each of the pins being adapted to pass through both of the slots.

12. An intermittent mechanical motion as characterized by claim 10 in which the pin means comprises a single pin adapted to pass alternately through the two slots.

13. An intermittent mechanical motion as characterized by claim 6 in which the pin comprises a roller that is carried by the drive member and is adapted to engage the opposite walls of the slots.

14. An intermittent mechanical motion as characterized by claim 6 in which there is a pair of gears rotatable with said members for effecting a constant velocity ratio drive between them, certain teeth of the gears being mutilated for a portion of their length to provide a hiatus in the constant velocity ratio drive while the pin is passing through said slots and while it is passing from the outer end of one slot to the outer end of the other slot, and means arranged to operate in time with the drive member for effecting axial relative displacement of the members and also for effecting a relative axial displacement of the gears, to render the pin and slots unengageable and to render the unmutilated portions of said certain teeth engageable with their mates for a period during each cycle of operation, which period begins after the pin has left the inner end of said other slot.

15. An intermittent mechanical motion as characterized by claim 14 in which the last-mentioned means effects a relative axial displacement of the members, to render the pin and slots unengageable for a period during each cycle which begins after the pin has left the outer end of said one slot.

16. An intermittent mechanical motion comprising a rotatable driven member having a pair of non-radial slots open at both ends and a rotatable drive member having a pin arranged to pass alternately through the slots by entering each of them at one end and leaving from the opposite end, each slot having its opposite ends at different radial distances from the axis of the driven member, the slots being so disposed that their outer ends both lie in the path of the pin in one position of the driven member and that the pin imparts zero velocity to the driven member when at the outer ends of the slots and zero acceleration when at the inner ends of the slots, a pair of gears rotatable with the members for effecting a constant velocity ratio drive between them during the part of each cycle of operation beginning when the pin leaves the inner end of one slot and ending when the pin next enters the inner end of the other slot, certain teeth of the gears being mutilated for a portion of their length to provide a hiatus in such constant velocity ratio drive during other parts of each cycle, and means arranged to operate in time with the drive member for effecting a relative axial displacement of the members and of the gears during such constant velocity drive for rendering the pin and slots unengageable and concomitantly rendering the unmutilated portions of said certain teeth engageable with their mates, whereby the driven member may make more than one turn during said part of the cycle.

17. An intermittent mechanical motion as characterized by claim 16 in which said means effects a relative axial displacement of the members, to render the pin and slots unengageable for a period during each cycle which begins after the pin has left the outer end of said other slot.

18. An intermittent mechanical motion comprising a rotatable driven member having a pair of non-radial slots open at both ends and a rotatable drive member having a pin arranged to pass alternately through the slots by entering each of them at one end and leaving from the opposite end, each slot having its opposite ends at different radial distances from the axis of the driven member, the slots being so disposed that their outer ends both lie in the path of the pin in one position of the driven member, a pair of gears rotatable with the members for effecting a constant velocity ratio drive between them during one part of each cycle of operation beginning when the pin leaves the inner end of one slot and ending when the pin next enters the inner end of the other slot, certain teeth of the gears being mutilated for a portion of their length to provide a hiatus in such constant velocity drive during other parts of each cycle, cam means arranged to operate in time with the drive member to effect a relative axial displacement of the gears during such constant velocity drive for rendering the unmutilated portions of said certain teeth engageable with their mates, whereby the driven member may make more than one turn during said one part of each cycle, and other cam means arranged to operate in time with the drive member to effect relative axial displacement of said members to render the pin and slots unengageable concomitantly with said displacement of the gears and during the part of each cycle beginning when the pin leaves the outer end of said other slot.

ERNEST WILDHABER.

References Cited in the file of this patent

UNITED STATES PATENTS

| Number | Name | Date |
|---|---|---|
| 2,449,852 | Jones | Sept. 21, 1948 |

FOREIGN PATENTS

| Number | Country | Date |
|---|---|---|
| 523,676 | France | Apr. 27, 1921 |